Dec. 6, 1932.    A. L. FREEDLANDER    1,890,081
PROCESS OF MAKING A PUNCTUREPROOF INNER TUBE
Filed July 29, 1929
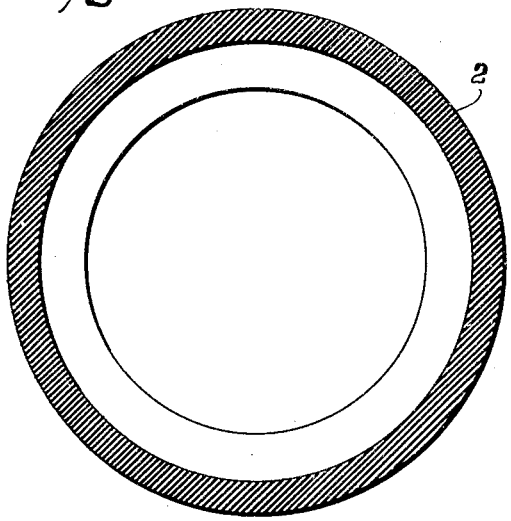
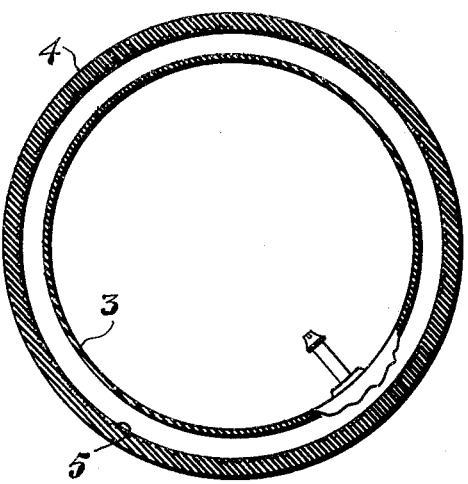
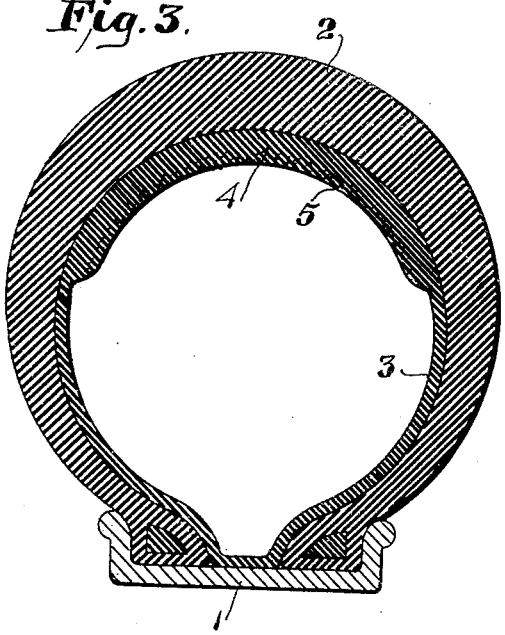
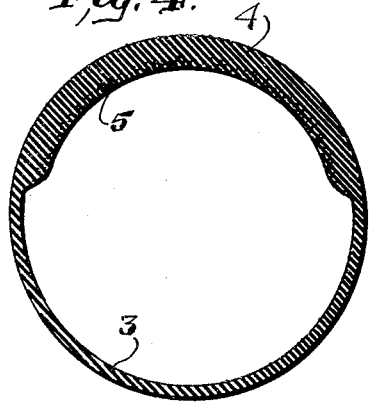
ABRAHAM L. FREEDLANDER, Inventor Patented Dec. 6, 1932

1,890,081

UNITED STATES PATENT OFFICE

ABRAHAM L. FREEDLANDER, OF DAYTON, OHIO, ASSIGNOR TO THE DAYTON RUBBER MANUFACTURING COMPANY, OF DAYTON, OHIO, A CORPORATION OF OHIO

PROCESS OF MAKING A PUNCTUREPROOF INNER TUBE

Application filed July 29, 1929. Serial No. 382,033.

My invention relates to inner tubes for tires and in particular to puncture-proof tubes.

It is an object of my invention to provide a compound for such tubes and for a physical construction as well as a method of manufacturing the tubes that will provide the requisite chemical and physical characteristics.

It is a further object of my invention to provide a molded puncture-proof tube and to eliminate turning the tube inside out, or applying special compounds, gums or viscous materials.

Referring to the drawing:—

Fig. 1 is a section through a diagrammatic view of a tire casing;

Fig. 2 is a section through the puncture-proof tube which is about seven per cent greater diameter circumferentially than the casing;

Fig. 3 is a section through the casing and tube taken transversely thereof;

Fig. 4 is a transverse section through the tube in deflated condition when it is normally about ten per cent less in transverse section than the transverse space within the casing.

Referring to the drawing in detail, 1 is a tire rim on which is mounted a tire 2 within which is located the wall of the inner tube. The inner tube is composed of a thin inner portion 3 and a thick outer portion 4 located beneath the tread of the tire. The inner side of the thick portion of the tube, as indicated by the fine dots at 5, is left in an undercured condition, while the remainder of the tube has been normally cured.

When the tube is extruded from the tube mill it is composed all of the same composition hereinafter specified, the upper half being left thicker, as at 4. The ends of the tube are joined together in the usual manner, placed in a mold, air of about 50 pounds pressure is placed inside the tube and the tube is cured in the mold in approximately ten minutes. This period of time is sufficient to cure the portion 3 of the tube and the outer part of the outer portion 4 of the tube, but does not sufficiently cure the inner part 5 of the portion 4, although to all intents and purposes from a visual inspection the inner portion 5 is hard and smooth and is not sticky or viscous.

The composition of this tube is as follows:—

2 lbs. sulphur
2 lbs. red oxide
17 lbs. 7 oz. Blanc Fixe
10 lbs. 15 oz. zinc oxide
66 lbs. 13 oz. smoke sheets washed
3½ oz. captax
3½ oz. diphenylguanidine
8 oz. paraffin
5 oz. Age Rite powder (anti-oxidant)

The chemical name for captax is mercaptobenzothiazole

The function of captax is to accelerate the vulcanization at low temperatures, while diphenylguanidine is an accelerator that acts at higher temperatures, but its rate of acceleration when represented by a curve has a flat place therein. It is at that flat place in the curve that the temperature of vulcanization is cut off in vulcanizing the present tube. The captax serves to accelerate the vulcanization so far as the ten minutes heat can carry it, but the diphenylguanidine delays the acceleration for a longer or higher temperature, or both, and the tube is withdrawn from the heat prior to the accomplishment of that temperature leaving the inner portion 5, to which the heat arrives last, undercured.

When the tube is placed within the tire casing, it is compressed circumferentially and expanded transversely. The undercured portion of the tube serves to close any puncture in the tube and prevents the escape of air, while the greater strength of the portion of the tube that is fully cured serves to prevent a rupture by the puncturing article penetrating the undercured portion of the tube.

It will be understood that I desire to comprehend within my invention and within the scope of my claims such modifications as may be fairly comprehended within such claims and invention due to necessary modification to adapt my invention to varying conditions of use and to varying purposes.

Having thus fully described my invention, what I claim as new and desire to secure by Letters Patent, is:

1. In a method of manufacturing tire tubes, in forming a tube having a low temperature accelerator, one portion of the wall of which is thicker than the other portion, placing the tube in a mold, inflating with air and curing until all of the tube is cured except the interior of the thicker portion.

2. In a process of making a puncture-proof inner tube, mixing a compound of sulphur, oxide, rubber, a low temperature accelerator and a high temperature accelerator, making one portion of tube thicker than the other portion of the tube so as to delay the action of the heat applied to the exterior of the tube on the interior of the thickened portion and heating the exterior only of said tube to a point where the low temperature accelerator takes effect and withdrawing the tube from the heat before the high temperature accelerator completes its acceleration on the interior of the thickened portion of the tube.

In testimony whereof, I affix my signature.

ABRAHAM L. FREEDLANDER